US012353616B2

(12) United States Patent
Hajimirza et al.

(10) Patent No.: US 12,353,616 B2
(45) Date of Patent: Jul. 8, 2025

(54) COLLECTING OF POINTS OF INTEREST ON WEB-PAGES BY EYE-TRACKING

(71) Applicant: Lumen Research Ltd, London (GB)

(72) Inventors: Navid Hajimirza, London (GB); Andrew Walker, London (GB)

(73) Assignee: Lumen Research Ltd., London (GB)

( * ) Notice: Subject to any disclaimer, the term of this patent is extended or adjusted under 35 U.S.C. 154(b) by 0 days.

(21) Appl. No.: 17/250,972

(22) PCT Filed: Oct. 3, 2019

(86) PCT No.: PCT/GB2019/052800
§ 371 (c)(1),
(2) Date: Apr. 5, 2021

(87) PCT Pub. No.: WO2020/070509
PCT Pub. Date: Apr. 9, 2020

(65) Prior Publication Data
US 2021/0349531 A1 Nov. 11, 2021

(30) Foreign Application Priority Data

Oct. 3, 2018 (GB) .................................... 1816158

(51) Int. Cl.
*G06F 3/01* (2006.01)
*G06F 40/143* (2020.01)
*H04L 67/50* (2022.01)

(52) U.S. Cl.
CPC ............ *G06F 3/013* (2013.01); *G06F 40/143* (2020.01); *H04L 67/535* (2022.05)

(58) Field of Classification Search
CPC ....... G06F 3/013; G06F 40/143; H04L 67/22; H04L 67/535

USPC .......................................................... 715/234
See application file for complete search history.

(56) References Cited

U.S. PATENT DOCUMENTS

| 6,106,119 | A | * | 8/2000 | Edwards | .............. A61B 3/0025 351/209 |
| 6,601,021 | B2 | * | 7/2003 | Card | ...................... G06F 3/013 340/3.6 |
| 6,608,615 | B1 |   | 8/2003 | Martins | |

(Continued)

FOREIGN PATENT DOCUMENTS

| EP | 1213642 B1 | 4/2005 |
| WO | 2013/101143 | 4/2013 |

OTHER PUBLICATIONS

Hoffman, C.,"The Beginner's Guide to Tabbed Browsing," (Oct. 24, 2012), from How-To Geek blog, 9 pages.*

(Continued)

*Primary Examiner* — Thu V Huynh
(74) *Attorney, Agent, or Firm* — Banner & Witcoff, Ltd.

(57) ABSTRACT

Systems and methods for collecting visual attention information are described. The methods comprise the steps of displaying a browser window on a display (210); estimating a user's (220) gaze point within the display (210); transforming the geometry of the estimated gaze point and/or the geometry of the browser window to a common coordinate system; identifying an object (215) in the browser window that corresponds to the estimated gaze point; and storing the estimated gaze point and data corresponding to the identified object (215).

18 Claims, 7 Drawing Sheets

(56) References Cited

U.S. PATENT DOCUMENTS

| | | | | |
|---|---|---|---|---|
| 6,712,468 | B1* | 3/2004 | Edwards | G06F 3/013 |
| | | | | 396/51 |
| 7,029,121 | B2* | 4/2006 | Edwards | G06F 3/013 |
| | | | | 702/187 |
| 8,136,944 | B2* | 3/2012 | De Lemos | G06V 40/19 |
| | | | | 382/103 |
| 9,223,854 | B2* | 12/2015 | Dey | G06F 16/338 |
| 9,823,808 | B2* | 11/2017 | Crain | G06F 3/0481 |
| 10,303,247 | B2* | 5/2019 | Xu | G06V 40/19 |
| 10,318,601 | B2* | 6/2019 | Ramachandra | G06F 16/2453 |
| 2002/0103625 | A1* | 8/2002 | Card | G06F 3/013 |
| | | | | 702/187 |
| 2004/0156020 | A1* | 8/2004 | Edwards | G06F 3/013 |
| | | | | 351/209 |
| 2006/0256083 | A1* | 11/2006 | Rosenberg | G06F 3/013 |
| | | | | 345/156 |
| 2007/0180364 | A1* | 8/2007 | Kobayashi | G06F 40/106 |
| | | | | 715/210 |
| 2010/0039618 | A1* | 2/2010 | De Lemos | G06V 40/19 |
| | | | | 351/209 |
| 2010/0295774 | A1* | 11/2010 | Hennessey | G06F 3/013 |
| | | | | 382/103 |
| 2013/0258089 | A1* | 10/2013 | Lyons | H04N 5/2257 |
| | | | | 348/77 |
| 2014/0208226 | A1* | 7/2014 | Lyons | G06F 3/013 |
| | | | | 715/747 |
| 2015/0074563 | A1* | 3/2015 | Crain | G06Q 10/109 |
| | | | | 715/760 |
| 2016/0128568 | A1* | 5/2016 | Bellamy | A61B 3/005 |
| | | | | 351/209 |
| 2016/0195924 | A1 | 7/2016 | Weber | |
| 2017/0053304 | A1* | 2/2017 | Eskilsson | G06F 16/951 |
| 2017/0212663 | A1* | 7/2017 | Breedvelt-Schouten | |
| | | | | G06F 9/451 |
| 2017/0293352 | A1 | 10/2017 | Todeschini | |
| 2017/0308162 | A1* | 10/2017 | Xu | G06F 16/436 |
| 2019/0050486 | A1* | 2/2019 | Ramachandra Iyer | |
| | | | | H04N 21/44218 |

OTHER PUBLICATIONS

Buscher, G. et al., "What Do You See When You're Surfing? Using Eye Tracking to Predict Salient Regions of Web Pages," CHI 2009, Apr. 4-9, 2009, Boston Massachusetts, USA, (c) 2009, ACM, pp. 21-30. (Year: 2009).*

Dontcheva, M. et al., "Summarizing Personal Web Browsing Sessions," UIST'06, Oct. 15-18, 2006, Montreux, Switzerland, (c) 2006, ACM, pp. 115-124. (Year: 2006).*

Loyola, P. et al., "Combining Eye Tracking and Pupillary Dilation Analysis to Identify Website Key Objects," Elsevier, (c) Jun. 12, 2015, pp. 179-189. (Year: 2015).*

Slanzi, G. et al., "Eye Tracking and EEG Features for Salient Web Object Identification," (c) 2015, Springer, pp. 3-12. (Year: 2015).*

David Beymer and Daniel M. Russell. 2005. WebGazeAnalyzer: a system for capturing and analyzing web reading behavior using eye gaze. Association for Computing Machinery, New York, NY, USA, 1913-1916. (Year: 2005).*

N. Meng and F. Meng, "An evaluation method of web energy based on content tendency and users' focus," 2017 4th International Conference on Systems and Informatics (ICSAI), 2017, pp. 1616-1620, doi: 10.1109/ICSAI.2017.8248542. (Year: 2017).*

Lamberti, Fabrizio, Gianluca Paravati, Valentina Gatteschi and Alberto Cannavò. "Supporting Web Analytics by Aggregating User Interaction Data From Heterogeneous Devices Using Viewport-DOM-Based Heat Maps." IEEE Transactions on Industrial Informatics 13 (2017): 1989-1999. (Year: 2017).*

F. Lamberti and G. Paravati, "VDHM: Viewport-DOM Based Heat Maps as a Tool for Visually Aggregating Web Users' Interaction Data from Mobile and Heterogeneous Devices," 2015 IEEE International Conference on Mobile Services, 2015, pp. 33-40, doi: 10.1109/MobServ.2015.15. (Year: 2015).*

Georg Buscher, Edward Cutrell, and Meredith Ringel Morris. 2009. What do you see when you're surfing? using eye tracking to predict salient regions of web pages. In Proc. of the SIGCHI Conf. on Human Factors in Comp. Sys. (CHI '09). ACM. (Year: 2009).*

J. D. V. Silva, "Improvement of a Methodology for Website Keyobject Identification through the Application of Eye-Tracking Technologies," 2012 IEEE/WIC/ACM International Conferences on Web Intelligence and Intelligent Agent Technology, Macau, China, 2012, pp. 59-63 (Year: 2012).*

Velasquez, Juan & Dujovne, Luis & L'Huillier, Gaston. (2011). Extracting significant Website Key Objects: A Semantic Web mining approach. Eng. Appl. of AI. 24. 1532-1541. 10.1016/j.engappai. 2011.02.001. (Year: 2011).*

Reeder, Robert & Pirolli, Peter & Card, Stuart. (2001). WebEyeMapper and WebLogger: Tools for Analyzing Eye Tracking Data Collected in Web-use Studies. Conference on Human Factors in Computing Systems, pp. 19-20. (Year: 2001).*

Duchowski, A.T. A breadth-first survey of eye-tracking applications. Behavior Research Methods, Instruments, & Computers 34, 455-470 (2002). (Year: 2002).*

Yeliz Yesilada, Caroline Jay, Robert Stevens, and Simon Harper. 2008. Validating the use and role of visual elements of web pages in navigation with an eye-tracking study. In Proceedings of the 17th international conference on World Wide Web (WWW '08). Association for Computing Machinery, 11-20. (Year: 2008).*

R. Menges et al. 2018. Enhanced representation of web pages for usability analysis with eye tracking. In Proceedings of the 2018 ACM Symposium on Eye Tracking Research & Applications (ETRA '18). Association for Computing Machinery, pp. 1-9. (Year: 2018).*

Wu, Shyi-Huey et al., "Meaningful Object Extraction for Booking Website," 2015, pp. 161-169. (Year: 2015).*

Beymer, David & Russell, Daniel. (2005). WebGazeAnalyzer: a system for capturing and analyzing web reading behavior using eye gaze. 1913-1916. (Year: 2005).*

Pablo Loyola, Gustavo Martinez, Kristofher Muñoz, Juan D. Velásquez, Pedro Maldonado, Andrés Couve, Combining eye tracking and pupillary dilation analysis to identify Website Key Objects, Neurocomputing, vol. 168, 2015, pp. 179-189. (Year: 2015).*

* cited by examiner

COLLECTING OF POINTS OF INTEREST ON WEB-PAGES BY EYE-TRACKING

The present invention relates to methods, apparatuses and systems for eye-tracking. In particular, the present invention relates to visual attention tracking on digital displays.

BACKGROUND TO THE INVENTION

Eye-tracking (otherwise known as gaze tracking), is the process of tracking a person's point of gaze in the surrounding environment to discover what he or she is looking at, at a given point of time. Methods for eye-tracking go back to 1879 when eye movements were first studied by direct observation of a person's eyes. This is when Louis Emile Javal realised that a reader's gaze jumps through text with small pauses rather than smoothly moving their gaze point. Since then, technology has experienced advances such that modern eye tracking methods can be performed with commercially available webcams.

There are presently two main systems for eye-tracking. The first makes use of commercially available webcams; the second makes use of Infra-Red (IR) based trackers. IR trackers typically have one or two cameras, each having IR filter(s) attached, and one or more sources of IR light. Both of these systems use essentially the same method to perform eye-tracking. First, image processing is used to first locate a subject's eyes inside the frames of video images that they capture of a subject's face. These methods then calculate the three dimensional coordinates of two imaginary lines (hereinafter referred to as reference lines) that pass through the located eyes in each frame. The intersection of these reference lines with surrounding objects provides an estimated gaze point of the subject on that object. The accuracy of both these systems can be increased dramatically by initially performing a system calibration step for each particular subject. When properly calibrated, IR trackers can accurately locate a subject's gaze point with less than a 1 cm error, when the subject is 50 cm from the object that they are looking at.

Webcam-based trackers are cheaper and more accessible to the public. However, their accuracy is questionable and they require considerable processing power to perform the complex image processing.

IR based trackers are much more accurate than webcam-based trackers, but they are considerably more expensive. They can also require considerable processing power if they are not equipped with their own dedicated processing unit. Depending on the quality of the tracker camera and the power of the processing unit that runs the image processing, both webcam and IR trackers can produce data at a rate of 30 to 120 gaze points per second (or higher). Consequently, a subject's gaze point can be updated approximately every 0.033 to 0.008 seconds (or faster).

Recent developments in the field have been directed to estimating a user's gaze point on digital displays like computer monitors and mobile phone screens, whilst a user is looking at them. There is considerable commercial and technical value in being able to accurately track what a user is looking at on a given digital display. To keep a useful record of what a user has been looking at, both a record of the user's gaze point and a record of what was displayed on the digital display must be kept (typically by taking a series of snapshots or a video recording of the digital display). However, at recording rates of 30 to 120 gaze points per second (or higher), this record of gaze points and digital display quickly generates very large files which are computationally intensive to store, transmit, and process.

There therefore exists a need to provide improved methods, apparatuses and systems for eye-tracking in conjunction with digital devices.

SUMMARY OF THE INVENTION

In a first aspect, the present invention provides, a computer-implemented method for collecting visual attention information, comprising: displaying a browser window on a display; estimating a user's gaze point within the display; transforming a geometry of the estimated gaze point and/or a geometry of the browser window to a common coordinate system; identifying an object in the browser window that corresponds to the estimated gaze point; and storing the estimated gaze point and data corresponding to the identified object.

In a second aspect, the present invention provides, an apparatus, comprising: a processor; and memory storing computer readable instructions which, when executed, cause the system to perform the method of the first aspect.

In a third aspect, the present invention provides, a system for collecting visual attention information, comprising: a processor; memory; a display; and one or more eye tracking cameras, wherein the processor is arranged to: display a browser window on the display; estimate a user's gaze point within the display; transform a geometry of the estimated gaze point and/or a geometry of the browser window to a common coordinate system; identify an object in the browser window that corresponds to the estimated gaze point; and store the estimated gaze point and data corresponding to the identified object in the memory.

Further features of the invention are defined in the appended dependent claims.

BRIEF DESCRIPTION OF THE DRAWINGS

By way of example only, the present invention will now be described with reference to the drawings, in which.

DETAILED DESCRIPTION OF PREFERRED EMBODIMENTS

Figure 1A:
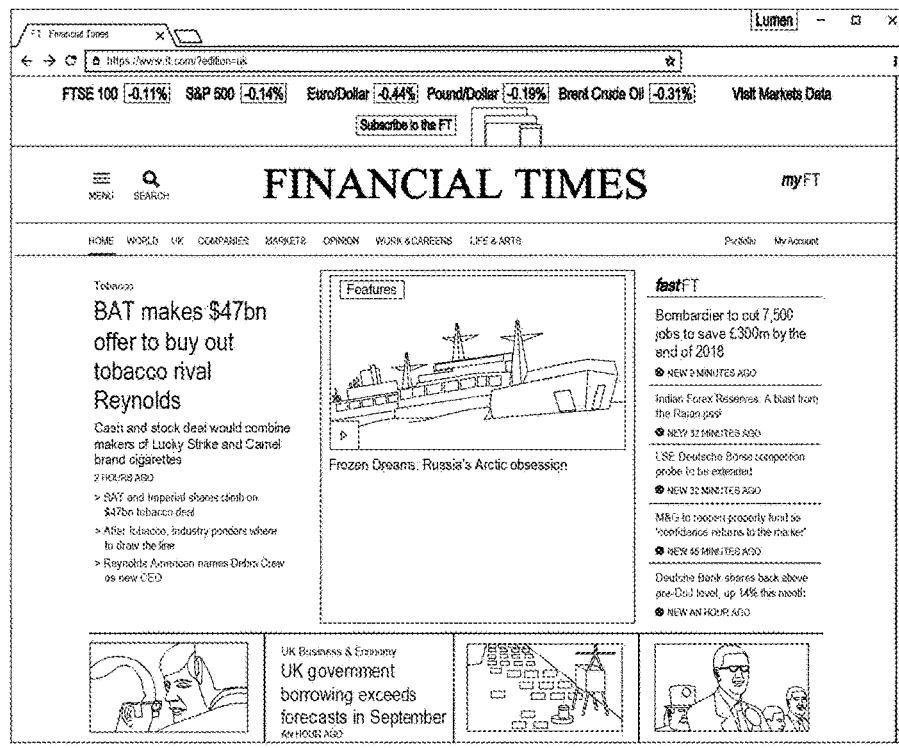
FIGS. 1a to 1d illustrate an example webpage showing the different positions of objects on the webpage in response to different screen and browser sizes.
Figure 1B:
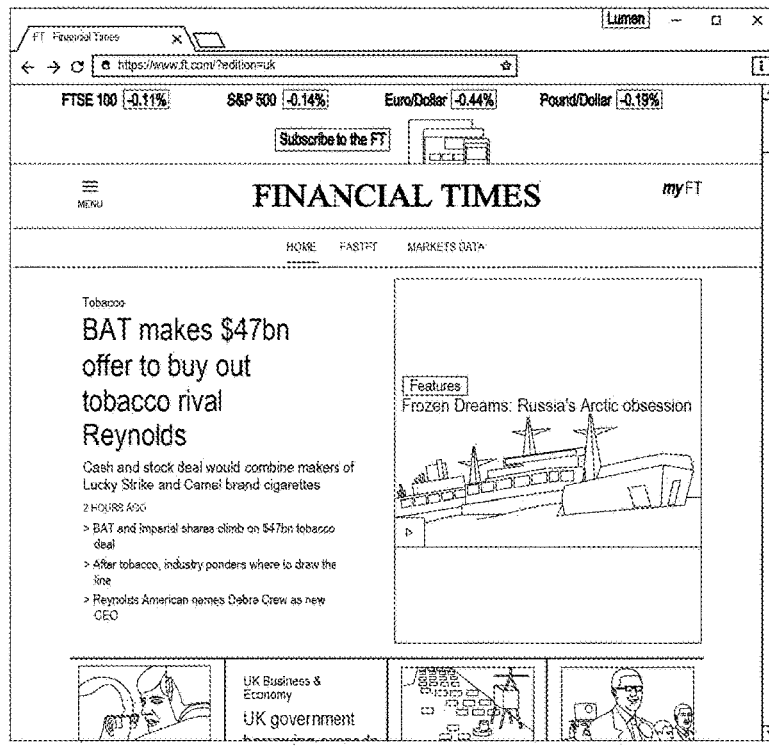
Figure 1C:
Figure 1D:

Estimating a subject's gaze point on a digital display may be done by finding the intersection of reference lines with the surface of a display screen, and then calculating the intersection point's coordinates with reference to the display screen coordinates. This produces a gaze point on a display screen that has three properties of distance, 1) the distance from the left of the screen (denoted as x), 2) the distance from the top of the screen (denoted as y), and 3) the time that the point was recorded (denoted as t). Hence, every gaze point on a digital display can be represented as GP=(x, y, t). It is possible to associate other information, like pupil diameter and eyeball rotation, with a gaze point and add it to the GP notation. However, for the purposes of understanding the present invention, the following will focus on x, y and t.

A sequence of gaze points that occur consecutively is known as a gaze point stream. The gaze point stream generated by a given eye tracker can be used to locate a user's gaze point on the display, measure the time a given point on the display is looked at (providing a measure of visual attention towards a given object on the display) and to control the display (by deliberate manipulation of the gaze point by the user).

Digital displays present visual content to users. Modern computers will typically run operating system software (such as Microsoft Windows®) to enable a variety of software applications to be presented to a user on a digital display. The operating system itself, and programs operating within the operating system may be rendered and displayed to a user through a digital display. In the present invention, any visual content that is displayable on a digital display should be considered to be within the scope of "visual content". Thus visual content, as referred to herein, includes rendered computer operating systems and computer software. In addition, broadcast television, visual media, video clips and still images, whether received from a processor or directly streamed to the digital display, all fall within the scope of visual content. One example of visual content that may be displayed to a user is an Internet browser (such as Microsoft Edge® and Mozilla Firefox®). The Internet browser may be arranged to present webpages to a user.

There are many problems with prior art methods and systems for tracking a user's attention to visual content through eye-tracking, otherwise known as "visual attention tracking". Many of these problems arise from the difficulty in accurately understanding what is being looked at by a user and the scale of the data that is generated by prior art methods.

For example, in order to measure visual attention directed towards the contents of a web page, it is essential to know where the user was looking and what was displayed at every point of time. The former can be achieved by using eye-trackers; however, the latter becomes challenging due to the dynamic structure of web pages.

FIGS. 1a to 1d illustrate how the same webpage may be rendered differently dependent on the type and size of browser window it is displayed in. FIGS. 1a to 1d progressively show the same webpage being displayed in a smaller browser window. For the same webpage, different content may be displayed at a given point on a display screen, depending on the size of the browser window that webpage is displayed in. From the moment a particular webpage is opened until the user navigates away, the webpage will likely undergo a series of changes. These changes can be caused by user interaction (scrolling, zooming, resizing of the browser window) or programmatically (programmed by the web developer, loading advertisements). This changing nature of web pages makes it extremely difficult to track their appearance on the display at a given point of time.

At the time of writing, the size of the homepage of google.com® is 250 KB, facebook.com® is 1.3 MB and guardian.co.uk® is 1 MB. If the gaze of a user is tracked for 1 hour per day using prior art methods, the size of the collected data for a single user will be over 1 GB each week. Consequently, for 5000 users, data volumes will be of the order of 5 TB per week. This volume of data is equivalent to collecting, storing and processing approximately half of the number of images users uploaded to Flickr® in 2015 (50 million images). This includes only webpages in HTML text format and excludes any images or videos that might accompany the page. This volume of data not only makes it challenging to scale user gaze-tracking across a large number of users, but the data volumes will significantly slow down the Internet connection speed of each user and occupy a large portion of their machine resources (processing power and memory). Hence these data volumes are impractical for both individual users, and for systems supporting a large number of users.

Whilst images displayed on webpages are difficult to capture due to file size, animated content on webpages provides further difficulties. There are 5 popular types of animated content known as GIF®, Flash®, CSS animation®, Canvas® and video. When trying to accurately measure visual attention using eye-tracking, it is important to know at each point of time which frame of the animated content is being shown to the user. HTML has standard access facilities to track video playback frames in its latest version, allowing each frame of the video to be treated as an image at any point of time. However, there are no such facilities for GIFs. Moreover, for Flash®, CSS animation® and Canvas® it is impossible to provide this level of break-down because these formats do not have any frames and the graphics are generated in real-time directly from the code. Hence, there are not suitable prior art methods for tracking these formats without taking high frame rate screen shots to continuously capture what is being displayed.

Taking screenshots whilst the user is browsing and later processing the screenshots to determine what was being displayed is a common prior art method which attempts to solve some of the above listed problems. However, this method introduces a new set of problems. The sampling rate for most eye-trackers is more than 30 Hz. Thus every 33 milliseconds the eye-tracker can provide 1 gaze point. To keep up with the sampling rate of the eye-tracker, screenshots should also be taken at a similar rate. This is similar to recording a full HD video from the screen and can add up to 32 GB per hour of data. This size of data not only creates problems for scalability of the platform on the cloud side, but also slows the user's machine by:

taking a large portion of their CPU processor to capture the screenshots, occupying a large portion of their memory to hold the recorded screenshots, occupying a large portion of their hard disk to store the data, and using a considerable amount of their Internet bandwidth to upload the data to the cloud.

It should be remembered that at the same time, a portion of the same processing resources are dedicated to operation of the eye-tracker for recording gaze data and to the browser to display the web content.

Whilst the computer processing and storage problems may be solved over time by improvements to computer hardware, the visual content still needs to be identified from these recorded screenshots. Currently, image processing technology is not sufficiently advanced to extract semantics from visual content. The alternative solution of using humans to identify and tag the content is expensive, time consuming and not scalable.

There are available algorithms capable of reading text from images, such as Optical Character Recognition (OCR) algorithms. However, typically the performance of these algorithms is poor when using small sized text and/or low resolution images, even when the text is still readable by human eyes. In the case of using screenshots to record the content shown to a user, the resolution of the captured video images cannot exceed the resolution of the user's monitor. Therefore, the resolution of the captured images is often too low for these algorithms to identify text correctly.

The applicant has recognised however, that the manner in which visual content is rendered and displayed provides for improved systems and methods for visual attention tracking.

As set out previously, one type of visual content for which you may wish to track a user's attention is a webpage. A webpage is presented to an Internet browser as a hypertext document. Hypertext documents are text documents that allow extensive cross-referencing between related sections of text and may produce associated graphic material. When a webpage is to be displayed on a display, the Internet browser reads through the hypertext document which defines the webpage and it renders the page onto the display, based on the information provided in the hypertext document.

This rendering step generates 2-dimensional or 3-dimensional images for display by several different processes, including loading of objects defined in the hypertext document and arranging the objects on the screen in the order provided for in the document. When rendering a hypertext document, an Internet browser typically generates a Document Object Model (DOM) which is a hierarchical tree structure comprising objects to be shown. The DOM is arranged such that all objects within the model have a parent in the tree structure, apart from the Document which is the top level parent for all objects in the model.

Objects within the DOM are typically referred to as "web content" or "web elements" and may be visible (for example, in the form of lines of text, images or videos) or invisible (for example, table structures without borders which are used to arrange the visible elements). It is possible to hide and show visible elements responsive to specific events occurring.

All objects in the DOM have properties associated with them that instruct how they should be rendered by the Internet browser. These properties include the object position on the display screen, the object size and dimensions, the object ID (that uniquely identifies it amongst other content), and the object class (that associate it with different groups of objects and allows the Internet browser to perform the same action to all objects in the same class, like rendering all objects in the "button" class in a grey colour). These properties can be changed by computer code that can accompany the hypertext document, this computer code may dynamically change the DOM. For example, computer code may change the "hidden" property of an element to "visible", thereby causing the Internet browser to render the previously hidden object on the display. This computer code may itself be responsive to an external action, for example, the computer code may be triggered when a mouse pointer is moved over a specific region of the display.

Recognition, location and extraction of these objects (and their corresponding properties) provides for accurate visual attention tracking with far smaller data volumes than prior art methods. The presently described invention provides solutions for recording and extracting elements of the Document Object Model (DOM) whilst gaze/eye tracking. The described solutions can be optimised to minimise storage requirements, reduce the amount of data needed to be transferred and to reduce the overall processing requirements of the system. Therefore, a scalable solution for collecting visual attention information in multi-user browsing sessions, in real-time, is provided.

The systems and methods described below determine which elements of visual information that is being displayed on a screen receive visual attention from a user. In addition, they seek to determine what the content of the element that attracted the visual attention is. This is achieved during tasked and/or natural browsing sessions by identifying and extracting elements (predetermined or non-predetermined) that received visual attention, as measured by gaze/eye tracking.

The systems and methods described below enable multiple users to be simultaneously engaged in eye/gaze tracking studies. The studies may track user interactions with visual content, and corresponding user input information. The described system and methods may optimise storage of some or all relevant browsing session data, either locally or on an external server. User data and/or user profile information may be processed and stored. The systems and methods may pre-process captured data on the user's computing device to reduce the data processing requirements of a central server. To further reduce storage and processing requirements, only a sub-set of identified elements may be analysed and stored. In addition, duplicated elements may be identified and only a single version of a duplicated element may be analysed and stored. Moreover, certain elements may be restricted from processing and/or storage to maintain user privacy.

The described systems and methods enable context awareness in the field of visual attention collection. One or more properties of an identified element may be determined and extracted. Solutions are provided which can recognise and process text, images, animated content and video content. The collected visual attention information may relate to, for example, a user's attention to a locally played video game, or an online video game.

By determining the digital signature of the contents of an element, it is possible to identify the reoccurrence of the same element at a later time, at a different position, or a different web page, even when the reoccurring element is not directly identifiable by the information provided in the DOM. This helps to prevent the collection and/or analysis of duplicate information relating to the same element in different contexts (e.g. comparing the performance of an ad with the same content placed in two different web pages with different contexts (e.g. sports vs politics) and publisher IDs). In addition, determination and use of the digital signature avoids a single element mistakenly being analysed as two or more distinct elements, which helps provide deeper insight into the performance of and/or attention given to a particular element in different contexts by aggregating its corresponding collected data from different contexts (such as the use of the same element across different web pages).

Figure 2:
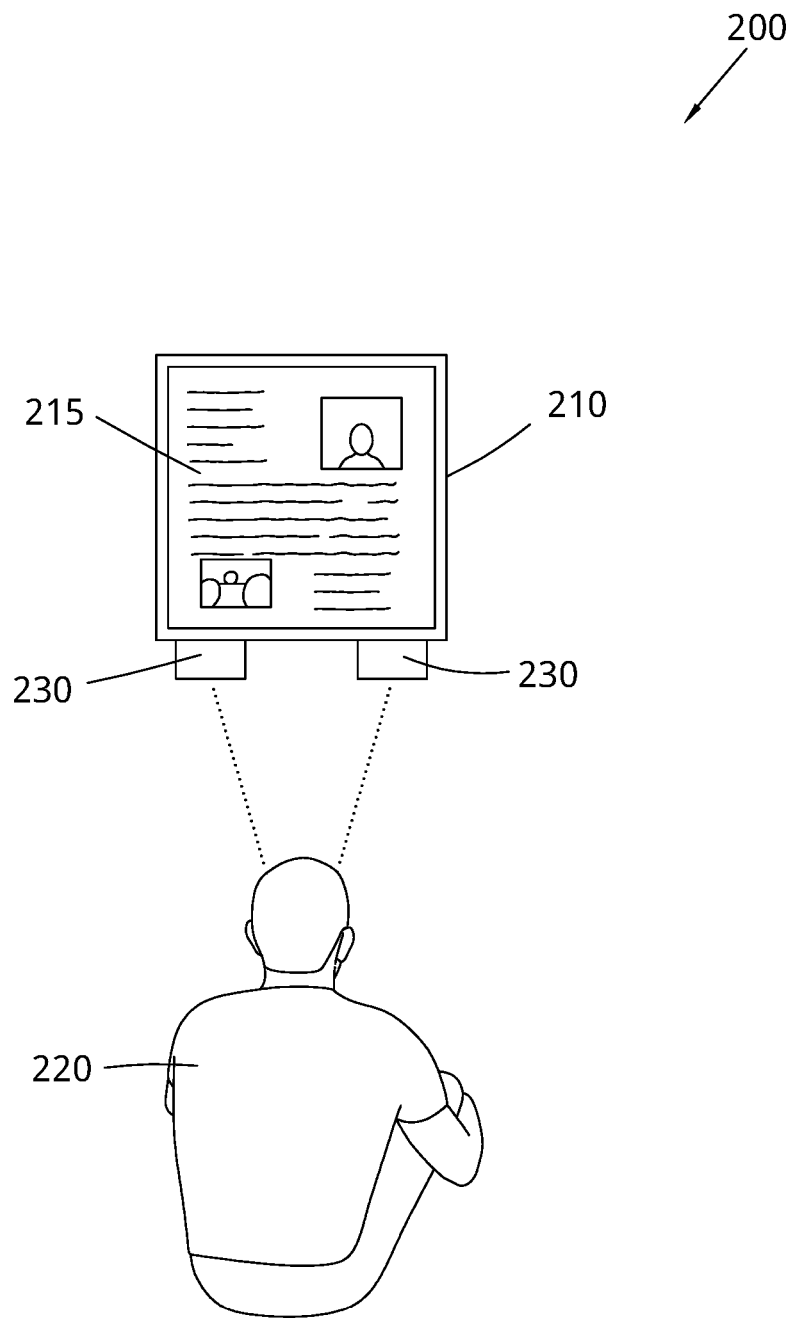
FIG. 2 is a diagram illustrating the relative position of a system in accordance with an embodiment of the invention and a user of said system.

A first embodiment of the invention will now be described with reference to FIG. 2. FIG. 2 illustrates a simplified overview of an eye-tracking system 200. The eye-tracking system 200 comprises a digital display 210. The digital display 210 is configured to display visual content 215 to a user 220.

The eye-tracking system 200 further comprises one or more eye-tracking cameras 230. In FIG. 2, two eye-tracking cameras 230 are illustrated. However, the invention may make use of one eye-tracking camera, three eye-tracking cameras, or any other number of eye-tracking cameras.

The eye-tracking system 200 also comprises a processor (not shown). The processor is used to output visual content to the digital display 210, and control the eye-tracking cameras 230. The processor may be integrated into the display 210 or be operably connected to the display 210. The processor may be any known type of processor, including one or more single-core or multi-core processors.

Figure 3:
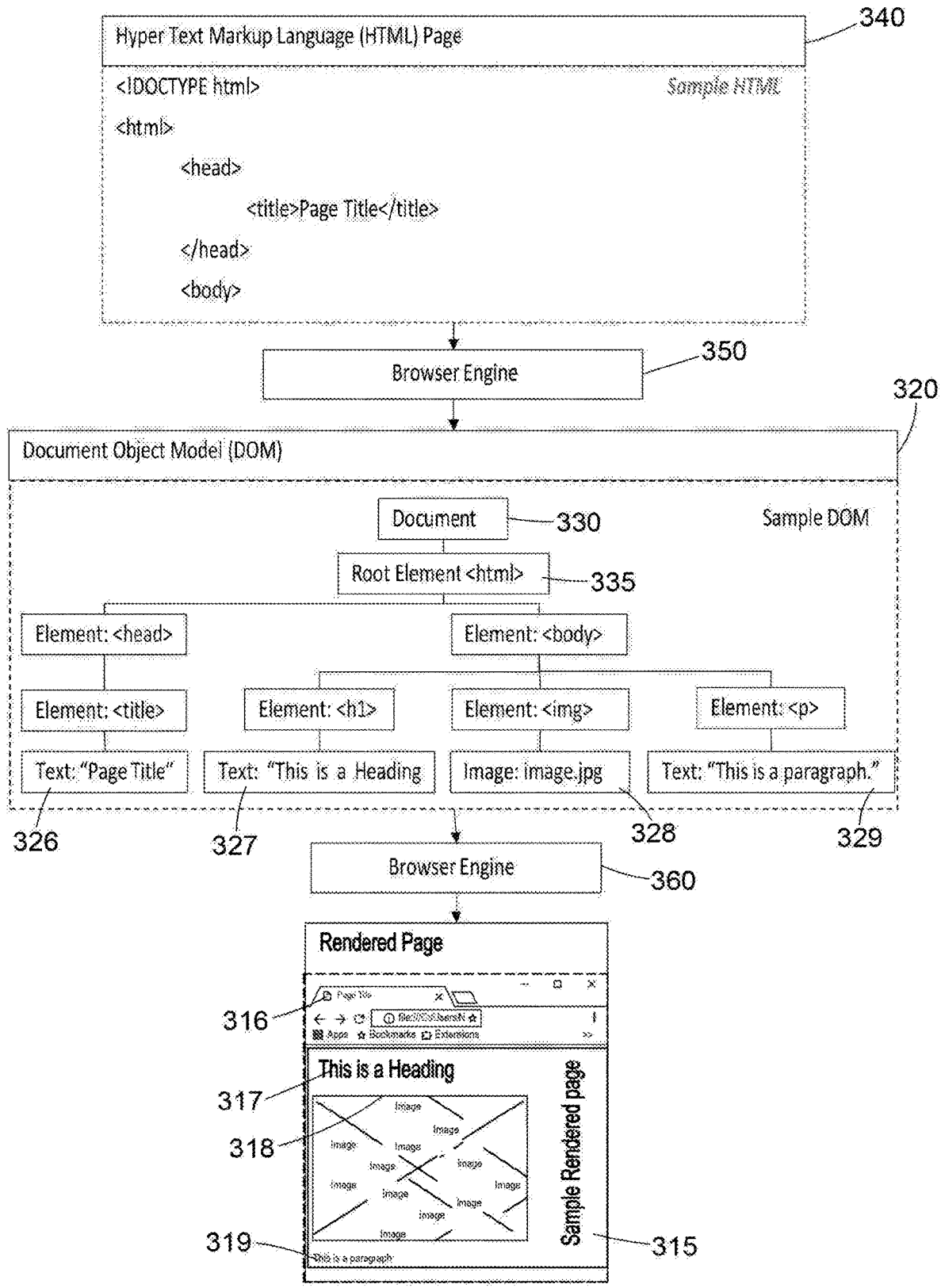
FIG. 3 is a diagram illustrating an exemplary HTML page being converted to a DOM tree which is then rendered into a browser window.

The visual content 215 will now be further described with reference to FIG. 3. FIG. 3 provides a representation of visual content 315 that may be displayed on a display 210. Visual content 315 is illustrated as a simplified webpage. The visual content 315 comprises a webpage title 316, a heading 317, an image 318 and some text 319. Each of the webpage title 316, the heading 317, the image 318 and the text 319 are "objects" that are defined within a Document Object Model (DOM) 320.

The DOM 320 comprises several branches, each of which corresponds to an object displayed in the webpage. Branch 326 corresponds to the page title 316 and comprises three parts: 1) the location of the object (Element: <head>), 2) the type of object (Element: <title>) and 3) the text for the title (Text: "Page Title"). Branch 327 corresponds to the heading 317 and comprises three parts: 1) the location of the object (Element: <body>), 2) the type of object (Element: <h1>) and 3) the text for the heading (Text: "This is a Heading"). Branch 328 corresponds to the image 318 and comprises three parts: 1) the location of the object (Element: <body>), 2) the type of object (Element: <img>) and 3) the image (Image: image.jpg). Branch 329 corresponds to the text 319 and comprises three parts: 1) the location of the object (Element: <body>), 2) the type of object (Element: <p>) and 3) the text (Text: "This is a paragraph"). In addition all objects 316 to 319 share two further parts in common, 1) the document root 330, and 2) root element 335.

The DOM 320 is itself a representation of the Hypertext Markup Language (HTML) that defines the webpage represented in the display. FIG. 3 illustrates a simplified HTML page 340 which represents the webpage. To convert between the HTML page and the DOM the system 200 may further comprises a Browser Engine 350. The Browser Engine 350 comprises computer code which is suitable for converting HTML to a DOM. Any known suitable computer code may be used to achieve this.

In addition, to convert the DOM to a rendered webpage suitable for display, the system 200 comprises a further Browser Engine 360. The further Browser Engine 360 comprises computer code which is suitable for rendering a DOM to a displayable image. Any known suitable computer code may be used to achieve this. In some embodiments, Browser Engine 350 and further Browser Engine 360 may be executed by the same computer code.

Figure 4:
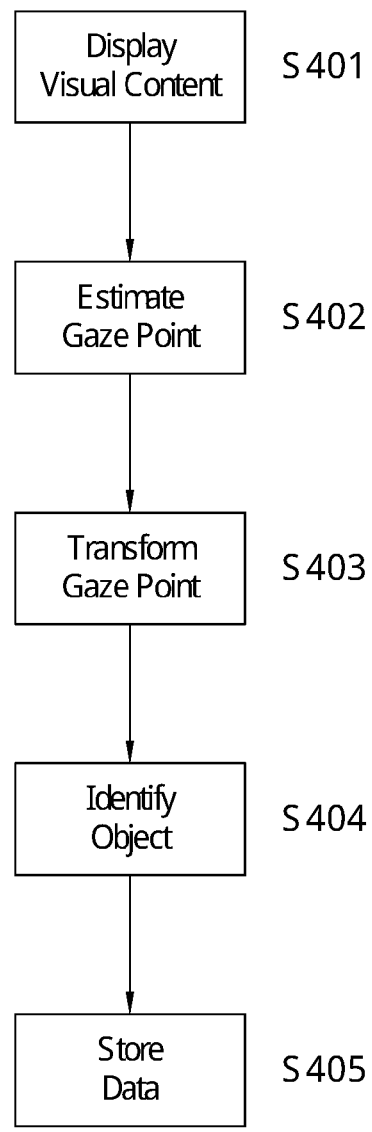
FIG. 4 is a flow chart illustrating a method in accordance with an embodiment of the invention.

An exemplary method for collating visual attention data using the system defined above will now be described with reference to FIG. 4 which is a flow chart illustrating a method in accordance with an embodiment of the invention.

At step S401, a browser window is displayed on a digital display 210. The exemplary method described below will track and record a user's gaze point in relation to this displayed browser window.

At step S402, the gaze point of the user upon the digital display 210 is estimated. The gaze point may be estimated by any known method, such as through use of two eye-tracking cameras focused on a user's eyes The two cameras may estimate a pupil position for each of the user's eyes and from each pupil position, find an intersection of two reference lines (drawn from each pupil) with the surface of a display screen. This intersection point can then be converted to display screen coordinates. This produces a gaze point on a display screen that has three properties, 1) the distance from the left of the screen (denoted as x), 2) the distance from the top of the screen (denoted as y), and 3) the time that the point was recorded (denoted as t). This provides an estimated gaze point on the digital display 210 which can be represented as GP=(x, y, t).

At step S403, the estimated geometry of the gaze point on the display screen 210 is transformed from the coordinate system of the display screen 210 to the geometry of the browser window. Alternatively, in some embodiments, this transformation may be transforming the geometry of the browser window to the geometry of the display screen 210 or transforming both geometries to any other predefined third coordinate system. This may be performed by any known method. Browser windows may be defined in x, y coordinates with respect to the available display screen size. Hence, the conversion of coordinates from the physical surface of the display screen to a virtual representation is possible given prior knowledge of the size of the display screen and the arrangement of elements displayed on the display screen.

At step S404, the transformed gaze point is used to identify an object, within the DOM, that corresponds to the estimated gaze point; this correspondence means the geometry of the gaze point falls within the surface area on the screen that the object covers. Since the DOM for a given webpage provides a location of each object within the DOM, along with a type of object and content of object, the object within a webpage that a user is looking at (i.e. the location of the estimated gaze point) can be extracted from DOM using the knowledge of the location of the transformed gaze point.

The object to be extracted contains additional information when rendered, such as geometry (the position, size and/or rotation of the object), pixel data and so forth. This additional information may also include the geometry of the object over time, whether the object is currently viewable or hidden, the ID and class of the object if provided by the publisher, the background colour and margin of the object etc. Where extraction of an object is referred to in this application, the "extracted" object may include some or all of this additional information which forms part of the rendered object.

In addition, each object may have type-specific information, some or all of which is useful to extract. The type specific information may include the following:

Text objects: text content, as well as text content properties such as font type, colour, highlight colour, size, orientation, etc.;

Image objects: link to the uniform resource indicator, URI, source of the image, image pixel data in binary format, the resolution of the image, encoding information related to the image, image format (such as JPEG, GIF, PNG etc.);

Video object: link to the URI source of the video, batch information of the video if the video is being streamed rather than being loaded from a specific URI, current frame of the video, sound on/off property, playback time etc.;

Table objects: number of rows, number of columns, sub-elements etc.;

Vector based graphics real-time webcam video feed objects: binary format of the frame that is being rendered at each point of time; and Other objects.

Objects can be extracted in various ways. An object can be extracted based on its identifier (ID), as the object's ID is unique in the DOM. When querying the DOM with the element's ID, only the object with the queried ID is returned (and can therefore be uniquely extracted).

Alternatively, objects can be extracted by class (e.g. extraction of any object belonging to a certain class, such as the "green-button" class (the class of objects rendered as a green-button)). When extracting by class, all objects tagged with the same class name are returned. Depending on the particular class, there may be one or more extracted objects.

Alternatively, objects can be extracted by type (e.g. images, text and so forth). When extracting by type, all objects tagged with the same type are returned. Alternatively, objects may be extracted by their coordinates on the display (once suitably converted to represent on screen object placement).

At step S405, the estimated gaze point may be stored in conjunction with data corresponding to the identified object. What data is stored may depend on the identified object. If an image is identified, the class identifier may be stored (identifying that an image was looked at) an image URL may be stored (enabling later extraction but with reduced data size), or the image may be extracted and stored (to provide a complete record), or no data may be stored (if images are not relevant). If a header or title is identified, the class identifier may be stored (identifying that a header or title was looked at) the header or title text may be stored (to provide a complete record), or no data may be stored (if headers or titles are not relevant). Likewise, if document text is identified, the class identifier may be stored (identifying that text was looked at) the text may be stored (to provide a complete record), or no data may be stored (if text is not relevant).

The method may then be repeated, providing an estimated gaze point stream in conjunction with a corresponding flow of data. This method of identifying what a user is looking at on a digital display 210 (so called visual attention tracking) is both computationally less intense and outputs lower data volumes than all known visual attention tracking systems and methods.

To further reduce data storage requirements, the method may only store gaze points and corresponding data that differs from preceding gaze points and/or data. Due to the speed at which gaze points and data may be identified, if a user looks at a given point on the screen for 5 seconds, nearly 150 data points (for systems running at 30 Hz) may be obtained. If these 150 data points are identical, only one data point needs to be stored. In conjunction, the period of time over which the data points remained identical may be stored.

The stored data may be kept in either temporary or permanent local storage. If the data is stored permanently it may not need to be uploaded or processed further. Data held in temporary storage may be processed and transferred to permanent storage (or transferred without processing). This permanent storage to which data is transferred may be local or external to the device.

Once the data has been gathered, the data may be analysed to extract insights from the data. This analysis may include, but is not limited to:

Analysis of the data to search for previously identified trends, data structures or events. This analysis may include:
extracting norms from the data, such as the number or proportion of users that look at a specific class of objects (e.g. the percentage of users that spend time looking at an advert on a web page), the average amount of time that users look at a specific object class (e.g. estimating that on average users spend 2 seconds looking at a given article's first paragraph);
extracting aggregated attention data with respect to a given object (e.g. estimating how long users look at a specific newspaper's article);
performing semantic analysis of images and videos that users have looked at in relation to visual attention;
Natural Language Processing of the text that users have looked at and the relation of the text content to visual attention.

Analysis of the data may also include providing access to an analyst to perform bespoke analysis or analysis of unpredicted types of information. This analysis may includes:
analysis of user's visual attention towards individual objects (e.g. How much attention the video of a specific car model receives)

Figure 5:
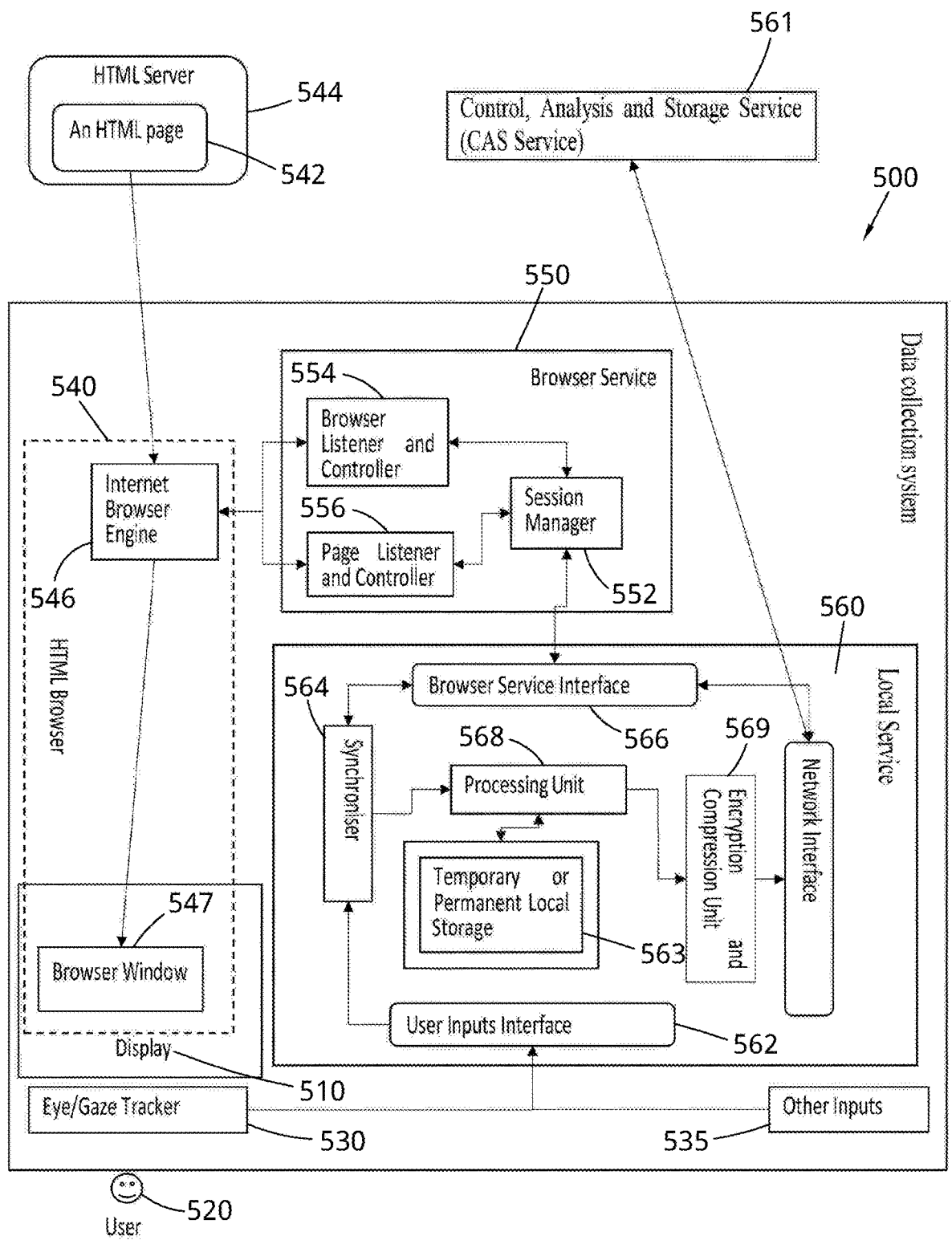
FIG. 5 is a schematic diagram illustrating a system in accordance with an embodiment of the invention.

FIG. 5 illustrates a more detailed eye-tracking system 500 in accordance with an embodiment of the invention. The eye-tracking system 500 comprises a digital display 510. The digital display 510 is configured to display visual content (not shown) to a user 520. The eye-tracking system also comprises one or more eye-tracking cameras 530. In FIG. 5, a single eye-tracking cameras 530 is illustrated. However, the invention may make use of two eye-tracking cameras, three eye-tracking cameras, or any other number of eye-tracking cameras.

The eye-tracking system 500 may also comprise additional inputs 535. The additional input 535 may comprise any user input such as a mouse input, a keyboard input, a touchscreen input and a verbal command.

The eye-tracking system 500 also comprises a processor (not shown). The processor is used to display visual content, and control the eye-tracking cameras 530. The processor may be integrated into the display 510 or be operably connected to the display 510. The processor may be any known type of processor, including one or more single-core or multi-core processors.

The processor is arranged to provide and display an Internet browser 540 upon the display 510. The Internet browser 540 accesses an HTML page 542 which is stored on an external HTML server 544 and renders and displays the HTML page to a user. The external HTML server 544 may be a locally provided server, form part of the Internet (such as a cloud server) or any other type of network.

The eye-tracking system 500 further comprises a browser service 550. The browser service 550 works as a plugin or extension to the Internet browser 540 and provides additional functionalities to the Internet browser 540. The browser service may facilitate communication with a browser engine 546 of the Internet browser 540, which renders webpages for display.

Due to security restrictions set by commercial Internet browsers (such as Microsoft Edge®) the browser service 550 may not be able to communicate with, or access, other machine resources of the eye-tracking system 500. For example, the browser service 550 may not have permission to communicate with the eye-tracking camera 530 directly. To overcome these restrictions, the eye-tracking system may further comprises a local service 560 that acts and appears as a server to the Internet browser 540 (since server communication is permitted by commercial Internet browsers, as being no different to communicating with external HTML server). The local service 560 is responsible for parsing communications between the browser service 550, the eye-tracking camera 530 and any additional inputs 535.

A user 520 may view an HTML page 542, served by the HTML Server 544. The HTML server 544 may be accessed by the browser engine 546 upon the user 520 requesting access to the HTML page 542 by providing a Uniform Resource Identifier (URI) to the Internet browser 540. The text content of the requested HTML page 542 may be downloaded to the eye-tracking system 500. As depicted in FIG. 3 the downloaded text may be converted to a Document Object Model (DOJ\;I) by the browser engine 546. Any other content of the HTJ\;IL page 542, such as JavaScript code, images, videos and other page resources may be fetched according to the instructions in the HTML text. The size, geometry and other parameters of the DOM objects may then be calculated and the result may be rendered on the browser window 547 on the display 510.

The browser engine 546 may be in constant, or regular, communication with the browser service 550. Communication may happen each time when an HTML page is accessed, downloaded, processed or rendered.

User browsing data can be collected by the browser service 550. The browser service 550 may comprise a session manager 552, which is responsible for controlling the two other modules of the browser service 550, which are the Browser Listener & Controller 554 and the Page Listener & Controller 556. The session manager 552 also controls the communication with the local service. The session manager 552 also keeps track of an active session which will be explained later.

The browser service 550 may also comprise a browser listener and controller 554 which monitors the user's 520 interaction with the browser window 547. The browser listener and controller 554 is responsible for monitoring browser events such as opening/closing tab events, opening/closing window events, and change of URI events. The browser listener and controller 554 may also be responsible for monitoring the status of the browser, status of the browser windows 547 and/or status of the browser tabs. The browser listener and controller 554 may also be responsible for controlling the browser window, performing actions such as opening or closing a browser window 547, opening or closing a tab in a window, or forwarding a tab to a specific URI.

The browser service 550 may also comprise a page listener and controller 556 which monitors for any changes to the HTML page 542. The page listener and controller 556 may have direct access and control over the DOM and its objects. The page listener and controller 556 may also be able to read from, modify, and add information to the DOM and each of its individual objects. Adding and/or modifying objects in the DOM may result in a change in the appearance of the webpage rendered on the display 510.

To extract information about an object, the page listener and controller 556 may query the browser engine 546, requesting the particular object and/or information about the particular object. The returned DOM object and/or information contains both generic and type-specific object information which is read, analysed and extracted by the page listener and controller 546.

Upon extraction of an object, the extracted data may be marked with a timestamp by the page listener and controller 556. This timestamp helps the synchroniser 564 (described further on) to match and synchronise the collected gaze points in the gaze stream with the collected data.

Sometimes it is not possible to extract all of the required information about a rendered object of interest. This could be because sufficient access has not been provided by the publisher or the browser engine, or if the object is being rendered in real-time. The page listener and controller 556 can determine that this is the case when it finds that it cannot extract the information from the object, or based on the specific object type (some object types may routinely limit the extraction of certain information). In this case, the page listener and controller 556 can take a screenshot of the displayed browser window. The screenshot may cover only part of the displayed browser window, or the entire displayed browser window. The page listener and controller 556 may selectively collect all or part of an object's associated information, as determined by CASS 561.

The screenshot may be converted to a text-based or binary-based signature, and the text-based or binary-based signature may be stored and used as an identifier for the screenshot (which in this case is the extracted object). The signatures may be universally unique, meaning that it uniquely identifies the screenshot. Such signatures may be created by hashing or any other known method of converting to a text or binary-based signatures.

In essence, the browser listener and controller 554 is responsible for matters in connection with the browser itself (e.g how many tabs are open in a Microsoft Edge® window, which tab is active, is the tab maximised or minimised, commands to open a new tab, close an expired tab, and so on). The page listener and controller 556 is responsible for matters in connection with an HTML page that is rendered by an active tab (e.g. is the HTML page completely loaded, what is the header of the page, what images are rendered in the page, put a next button in the page, make the page background black, and so on).

The browser service 550 therefore can monitor and control a user's 520 browsing session. A browsing session may be defined as comprising all of the entities (data, actions and events) that take place during the time a user is interacting with the eye-tracking system 500. The browsing session therefore has a start time and an end time defining the length of the session. The start time can be defined as the time at which the user 520 starts running the browser, starts the eye-tracking system 500 (or brings it out of a sleep or hibernation mode). The end time can be defined as the time at which the user 520 closes all open browser windows, turns off the eye-tracking system 500 (or puts the system into a sleep or hibernation mode), or after a predetermined time has elapsed since the user 520 last interacted with the system.

Each browsing session may be associated with a unique identification code, called a session ID. The session ID may be generated by the session manager 552 and associated with some or all of the information collected during the browsing session.

To ensure that the privacy of a user 520 is maintained, the eye-tracking system 500 may have additional functionality which can manually and/or automatically limit the system's access to user browsing data. To manually limit system access, the eye-tracking system 500 may provide one or more user input options that enable a user to turn off all data collection. These input options may comprise one or more graphical user interface inputs, or may make use of the eye-tracking camera 530 or additional input(s) 535.

To automatically limit the data collection, the browser listener and controller 554 may be limited to only monitoring an active browser window 547 and/or active tab within the active browser window 547.

Moreover, any collected data may be reviewed by the eye-tracking system before it is stored, to ensure that the data complies with one or more pre-set privacy rules. For example, the browser listener and controller 554 may extract the URI for each active webpage and pass it to the session manager 552. The session manager 522 may then pass this URI to the local service 560 which in turn may ask an external service, such as a control analysis and storage service (CAS service or CASS) 562, whether the URI is in a white list of permitted URIs. The answer received from the CASS 562 may then be cascaded back to the session manager 552 which then decides whether to accept (or request) browsing data from the page listener and controller 556. A similar process may also take place for limiting system access to sensitive DOM objects like password and bank card detail fields.

Whilst the collection of browsing data is taking place, a parallel process can collect a gaze point stream corresponding to a series of estimated user gaze points, determined by the eye-tracking camera 530. The estimated gaze point stream may then be passed to a user input interface 562. Optionally, other user interactions from additional input(s) 535 may also be sent to the user input interface 562. Furthermore, all data sent to the user input interface 562 may be time stamped with the time and date of occurrence or receipt.

Subsequently, all data received by the user input interface 562 can be passed to a synchroniser 564. For each gaze point in the gaze point stream, the synchroniser 564 may pass some or all data related to that gaze point to a browser service interface 566. The browser service interface 566 sends the data to the session manager 552 of the browser service 550. The browser service interface 566 acts as a server to the Internet browser 540 to ensure that the Internet browser 540 permits communication with the browser service interface 566.

When the session manager 552 receives data, the data is associated with the current session ID. The session manager 552 can then request browser data corresponding to the active browser tab(s) from the browser listener and controller 554. If the URI has been determined as black-listed by the CAS service 561, the gaze point data is returned to the local service 560 without any further information.

If the URI is white-listed by the CAS service 561, the session manager 552 then determines the coordinates of the browser tab of interest relative to the display coordinates. The eye-tracking system 500 maps (transforms) the geometry of the estimated gaze point and the active tab of the browser window 547 into a common same coordinate system and passes the result to the page listener and controller 556. Due to the dynamic nature of the content displayed in the browser window, the geometry transformation needs to be performed every time there is a change in the geometry of the browser window, or the objects inside it change. An example of these changes as the browser window is changed can be seen in FIGS. 1a to 1d, as described above.

The page listener and controller 556, acquires information corresponding to the transformed estimated gaze point, which relates to the object(s) of interest within the DOM. The information that is acquired may be pre-determined by the system or may be context specific. The acquired information may include: a) the object that corresponds to transformed estimated gaze point coordinates b) all of the visible on-screen objects, or c) all of the objects in the DOM.

The information acquired by the page listener and controller 556 is passed to the session manager 552. The session manager 552 packages together all of the information received from the page listener and controller 556, the browser listener and controller 554 and the gaze point data together and delivers the packaged data to the browser service interface 566. The browser service interface 566 may then pass this packaged data to the synchroniser 564.

The synchroniser 564 synchronises the packaged data with the data from the additional inputs 535 and sends the synchronised data to a processing unit 568. The processing unit 568 may further process the synchronised data before passing the data to a storage medium. This further processing may make use of local processing resources of the eye-tracking system 500 to reduce the amount of analytical processing required at a later date. This further processing may massively reduce the processing load required to analyse the data from many eye-tracking systems 500, as the data for each user is already part-processed locally.

This local processing may be any type of processing on a user's device that makes the data processing faster, easier, or cheaper for the CAS 662 perform. This local processing may include:

Semantic analysis of images and videos that a user has looked at;

Natural Language Processing of the text(s) that a user has looked at and their relation to the user's visual attention;

Browsing behaviour of the user who is using the system.

In short, the local processing may perform some or all the automated analysis that would otherwise be performed by the Data Analytic Unit 672 for the aggregated data of all users. Performing this analysis locally on each user's device, reduces the processing requirements of the central (cloud) computing system as the computation demand is distributed across all of the user's devices. Moreover, to aid privacy, it may be preferable to only locally process user's data, and thereafter send anonymised usage data to the central computing resource.

The processing unit 568 may store the further processed data in local data storage for future access, or to wait until sufficient processing or network capacity is available. The processing unit 568 therefore monitors the processor usage and/or network usage of the eye-tracking system to identify times at which these resources are required elsewhere. When sufficient system resources are available, the processing unit can pass the further processed data to an encryption and compression unit 569. The encryption and compression unit 569 is arranged to encrypt the further processed data to prevent unauthorized access, and to compress the data in order to reduce its size. Once encrypted and compressed, the encryption and compression unit 569 may cause the data to be transmitted over a network to the CAS Service 561.

Figure 6:
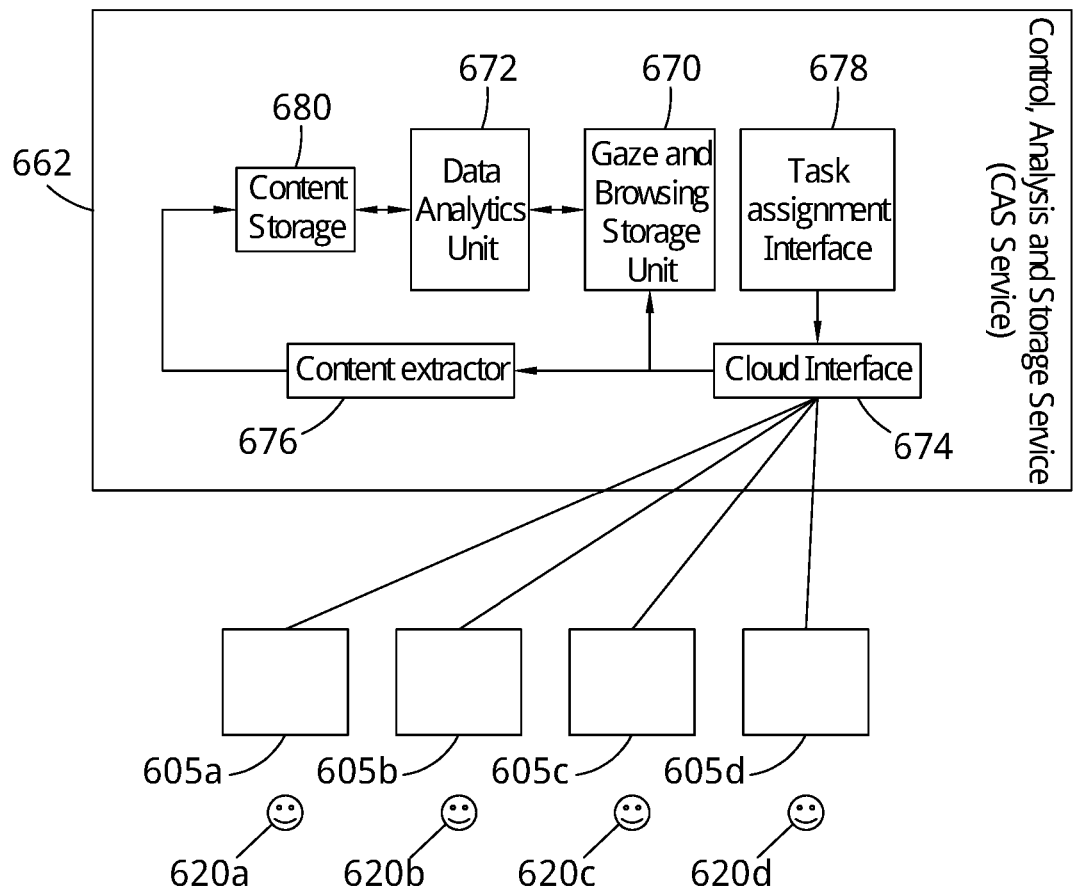
FIG. 6 is a schematic diagram illustrating a system in accordance with an embodiment of the invention.

FIG. 6 illustrates the CAS Service 561/662 of FIG. 5 in more detail. The CAS service 662 may receive data from a plurality of eye-tracking systems 605a-605d. In FIG. 6, four eye-tracking systems are illustrated, however many more may provide data to the CAS service 561. All of the eye-tracking systems 605a-605d may connect to CAS service 662 and transmit collected data. The CAS service 662 may accumulate received data in a gaze and browsing storage unit 670 for batch processing and analysis. This processing and analysis may be performed by a data analytics unit 672.

The CAS service 662 may therefore act as a remote cloud platform. The CAS Service 662 is responsible for receiving and storing data from multiple users. The data in the CAS service 662 may be stored in two places 1) the content storage 680 may be used for content related data (such as images, text, video or any other type of content that can be rendered on a display screen) and/or 2) the gaze and browsing storage unit 670 may be used for gaze stream data and user browsing data (such as navigated URIs, zooms, scrolls, and so on).

The CAS service 662 may reduce the total amount of stored data in the content storage 680 by avoiding storing duplicate data determined by the content extractor 676. This is done by a content extractor 676, which receives the newly uploaded content data (text, image, video, etc.) from a cloud interface 674, and compares the received data with the existing data stored in the content storage. If the received data does not exist in the content storage, this data is then stored. For example, if the eye tracking system of user 620*a* has previously uploaded an image and it is stored in Content Storage 680, when the eye tracking system of the user, or any other user, uploads the same image to CAS service 663-662 the newly uploaded images are not stored (they are discarded) as a copy of them already exists in Content Storage 680.

The CAS service 662 may also include a data analytics unit 672. The data analytics unit 672 may have direct access to the stored content data and the stored gaze and browsing data. The data analytics unit 672 may be arranged to perform one or more of the following tasks:
  analyse the data automatically for previously known type of information. This includes but is not limited to:
    extracting norms such as the percentage of users that look at a specific class of objects (e.g. the percentage of users that notice any advertising on top of a web page), the average amount of time that users spend on a specific object class (e.g. on average users spent 2 seconds reading any article's first paragraph), etc.
    extracting aggregated attention towards a specific object (for how long do users read a specific newspaper's article)
    Semantic analysis of images and videos that the users have looked at and its relation to visual attention
    Natural Language Processing of the texts that the users have read and its relation to visual attention
  provide access to an analyst for bespoke analysis or analysis of unpredicted types of information. This includes but is not limited to:
    Attention towards individual objects (e.g. How much attention the video of a specific car model receives)

The collected data may be used to reconstruct the browsing session at a later date. A reconstructed browser session allows an analyst to review the user's attention to displayed objects across a period of time. A reconstructed browser session may in essence be similar to the replaying of a video, where the sequential images are reconstructed from extracted object data and associated attention data. The images may be ordered and displayed based on recorded timestamp data, so that the correct images are rendered based on their timestamp at record time.

To achieve this, the content, geometry (position, rotation, size) and time of collection for each extracted object is recorded and stored. In conjunction with this data, the position and time of each corresponding gaze point is recorded and stored.

To reconstruct the browsing session, a timeline and a blank webpage is created for a recorded session of a web page. The original browsing session is then reconstructed in this blank webpage, based on the recorded data. This enables a user to view the reconstructed webpage with reference to the timeline. As the user views the reconstructed session, each object that was present at a particular time point is rendered with its content, and geometry. Optionally the corresponding gaze point that was collected at that timestamp can be indicated on the display at the correct location, such as by a circle, cross or other suitable marking.

The CAS service 662 may also include a task assignment interface 678, which provides a means to direct a user 520, or group of users, to a predefined set of HTML pages. The task assignment interface 678 may therefore cause a task to be displayed to a user and/or cause the display of a pre-defined webpage. The task assignment interface 678 may consequently enable the collection of user input information comprising data corresponding to the user's interaction with the task and/or pre-defined webpage. The task assignment interface 678 may also comprise means for communicating with one or more users 520 to facilitate, encourage and/or reward their participation.

The above described systems and methods are easily scalable. Whilst prior art methods can be scaled up, such scaling comes with an unacceptable cost, due to the processor requirements needed to scale such un-optimised systems. Where we refer to "easily scalable", we mean the presently described systems and methods are well-suited for cost-effective scaling. These systems and methods are scalable because they are specifically designed for scaling by significantly reducing the amount of data to be processed by the server by one or more of:
  Storing collected data on the user's computer system and making it available to the central server as and when required. This ensure data is not sent to the central server at times where it cannot be handled.
  Processing collected data before sending the data to the central server. The user's computer system may be used to, at least partly, process the collected data before passing the data to the central server. This effectively "crowd-sources" some or all of the required data processing, leading to large amounts of data being processed before reaching the central server. This in turn results in the central server requiring significantly less computing resources to process a given amount of raw data.
  Avoiding duplication of collected data by only collecting data that has not already been collected. This reduction in total data volume results in a reduction in the processing and storage resources required to handle a given set of data. An example of this can be when the size of an object changes we just record size change compared to the previous state.
  Avoiding collection of non-relevant/non-required data. This is achieved by identification of the extracted elements and discarding any non-relevant elements. For example, when a user is browsing a YouTube® webpage, collecting only data relating to the video and/or the displayed adverts and ignoring the comments section.

In addition, these systems and methods are scalable because they are adapted to be used with "cloud" solutions for data collection and storage (i.e. through cloud Interface 674 in CASS 561). By implementing some or all of the above features, the systems and methods can be efficiently scaled, handling an increasing number of users, without causing delays, data loss or unmanageable extra costs.

These systems and methods are also particularly suited to the tracking and analysis of the natural browsing of a user. Natural browsing occurs when a user is browsing a webpage "naturally", without having any specifically assigned tasks. The quality of collected data can differ between natural browsing and browsing in accordance with a specified task, as users generally pay attention differently to the same content when they face it as part of a task or when they encounter it as part of their normal browsing behaviour. As the present invention is designed to collect any form of data, in any web page, in any context, from any browser, in any number of windows, in any number of tabs, by acting as an add-on or extension to the browser, it is possible for users to add it to their browsers and forget that their attention is thereafter being tracked. This enables more "natural" browsing to be monitored, which can lead to an improvement in the collected data.

The above described systems and methods may operate on any computing system with sufficient processing power. These systems include laptop computers, tablet computers, desktop computers, stand-alone computers and mobile phones. Some modern smart-phones with one or more front-facing cameras are capable of stand-alone gaze tracking and may be used to perform the methods described herein without requiring additional equipment. Additionally, stand-alone camera systems may be used in conjunction with one or more of the computing systems described above to perform the methods described herein.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

The above embodiments describe one way of implementing the present invention. It will be appreciated that modifications of the features of the above embodiments are possible within the scope of the independent claims. For example, the methods described herein may be applied to any kind of computing system. Features of the present invention are defined in the appended claims. While particular combinations of features have been presented in the claims, it will be appreciated that other combinations, such as those provided above, may be used.

We claim:

1. A computer-implemented method for collecting visual attention information in real-time, comprising:
    displaying a browser window on a display, wherein the browser window is defined by a Document Object Model (DOM);
    generating a stream of estimated gaze points, wherein each estimated gaze point of the stream of estimated gaze points corresponds to an estimate of a user's gaze point within the display; and
    as the stream of estimated gaze points is being generated, for each estimated gaze point in the stream of estimated gaze points:
        transforming a geometry of the estimated gaze point and/or a geometry of the browser window to a common coordinate system;
        identifying an object within the DOM using the estimated gaze point, wherein a location of the identified object in the browser window corresponds to a location of the estimated gaze point;
        determining that the identified object comprises dynamic content rendered in real-time;
        capturing at least one screenshot of the identified object;
        converting the captured screenshot to a universally unique signature;
        extracting, from the DOM, the identified object and data corresponding to the identified object, wherein the data corresponding to the identified object comprises one or more properties indicative of how the identified object should be rendered in the browser window; and
        storing the estimated gaze point in conjunction with the identified object, the data corresponding to the identified object, the captured screenshot of the identified object and the universally unique signature, wherein the stored universally unique signature acts as an identifier for the identified object.

2. The computer-implemented method of claim 1, wherein transforming a geometry of the estimated gaze point and/or a geometry of the browser window to a common coordinate system comprises:
    estimating x and y coordinates of the estimated gaze point within an area of the display; and
    transforming the estimated coordinates to corresponding coordinates in an area of the browser window.

3. The computer-implemented method of claim 1, wherein transforming a geometry of the estimated gaze point to a geometry of the browser window comprises:
    transforming the geometry of the estimated gaze point to the geometry of the browser window; or
    transforming the geometry of the browser window to the geometry of the estimated gaze point; or
    transforming the geometry of the estimated gaze point and the geometry of the browser window to a third coordinate system.

4. The computer-implemented method of claim 1, wherein the browser window comprises a rendered hypertext mark-up language page.

5. The computer-implemented method of claim 1:
    wherein data corresponding to the identified DOM object is collected by accessing a source Uniform Resource Identifier, URI, of the identified DOM object.

6. The computer-implemented method of claim 1, further comprising the step of:
    mapping each geometry of each DOM object to the geometry of the estimated gaze point within the display; and/or
    mapping each geometry of each DOM object and the geometry of the estimated gaze point to the common coordinate system.

7. The computer-implemented method of claim 1, wherein the step of identifying the object comprises:
    locating an active tab in which content is being displayed within the browser window;

transforming the geometry of the estimated gaze point and/or the geometry of the active tab to the common coordinate system; and identifying the object from a rendered Document Object Model defining the active tab.

8. The computer-implemented method of claim 1, wherein:

the data corresponding to the identified object comprises one or more of: object shape, object size, object geometry, object content, object identity, object class, object colour;

data corresponding to the browser window is collected and stored, the data comprising one or more of: a Uniform Resource Identifier, URI, geometry of the browser window, number of opened tabs displayed within the browser window, number of opened windows displayed within the browser window, a date of access and/or a time of access.

9. The computer-implemented method of claim 1, further comprising:

collecting user input information comprising data corresponding to user interaction with the browser window, optionally wherein the user input information comprises data corresponding to one or more of: a touchscreen display input, movement of a computer mouse, a click of a computer mouse, a keyboard input, a user gesture collected by a gesture sensor.

10. The computer-implemented method of claim 1, further comprising one or more of the following steps:

sending the stored estimated gaze point and stored data corresponding to the identified object to a remote server;

measuring how long the estimated gaze point stays within the identified object; and recording, for each object displayed in the browser window, when and for how long each object is displayed on the display.

11. The computer-implemented method of claim 1, wherein:

data corresponding to a user is collected and stored;
the collected data corresponding to the user is stored locally; and/or
data may be collected from different users by a different user profile for each user.

12. The computer-implemented method of claim 1, further comprising, before storing the data, performing one or more of the following steps:

encrypting the data;
compressing the data;
performing image, video and/or text processing of the data; and
natural language processing the data.

13. The computer-implemented method of claim 1, wherein:

only data that is different to previously stored data is collected;
data is stored only if the identified object corresponds to a Uniform Resource Identifiers listed in a pre-defined list of Uniform Resource Identifiers; and/or
specific objects or classes of objects are excluded from being stored.

14. The computer-implemented method of claim 1, further comprising the steps of:

displaying a task on the display and/or displaying a pre-defined webpage in the browser window;

collecting user input information comprising data corresponding to user interaction with the task and/or pre-defined webpage;
analysing the extracted object; and
storing analysis data corresponding to the extracted object.

15. The computer-implemented method of claim 1, further comprising the steps of:

reconstructing a browsing session, based on the stored estimated gaze point and the data corresponding to the extracted object; and performing visual attention analysis on the reconstructed browsing session.

16. The computer-implemented method of claim 1, wherein the universally unique signature is a text-based signature or a binary-based signature.

17. One or more non-transitory computer readable media storing computer readable instructions which, when executed, cause a system to perform the following method;

displaying a browser window on a display, wherein the browser window is defined by a Document Object Model (DOM);

generating a stream of estimated gaze points, wherein each estimated gaze point of the stream of estimated gaze points corresponds to an estimate of a user's gaze point within the display; and as the stream of estimated gaze points is being generated, for each estimated gaze point in the stream of estimated gaze points:

transforming a geometry of the estimated gaze point and/or a geometry of the browser window to a common coordinate system;

identifying an object within the DOM using the estimated gaze point, wherein a location of the identified object in the browser window corresponds to a location of the estimated gaze point;

determining that the identified object comprises dynamic content rendered in real-time;

capturing at least one screenshot of the identified object;

converting the captured screenshot to a universally unique signature;

extracting, from the DOM, the identified object and data corresponding to the identified object, wherein the data corresponding to the identified object comprises one or more properties indicative of how the identified object should be rendered in the browser window; and storing the estimated gaze point in conjunction with the identified object, the data corresponding to the identified object, the captured screenshot of the identified object and the universally unique signature, wherein the stored universally unique signature acts as an identifier for the identified object.

18. A system for collecting visual attention information in real-time, comprising:

a processor;
memory;
a display; and
one or more eye tracking cameras, wherein the processor is arranged to:

display a browser window on the display, wherein the browser window is defined by a Document Object Model (DOM);

generate a stream of estimated gaze points, wherein each estimated gaze point of the stream of estimated gaze points corresponds to an estimate a user's gaze point within the display; and as the stream of estimated gaze points is being generated, for each estimated gaze point in the stream of estimated gaze points:
transform a geometry of the estimated gaze point and/or a geometry of the browser window to a common coordinate system;
identify an object within the DOM using the estimated gaze point, wherein a location of the identified object in the browser window corresponds to a location of the estimated gaze point;
determine that the identified object comprises dynamic content rendered in real-time;
capture at least one screenshot of the identified object;
convert the captured screenshot to a universally unique signature;
extract, from the DOM, the identified object and data corresponding to the identified object, wherein the data corresponding to the identified object comprises one or more properties indicative of how the identified object should be rendered in the browser window; and
store the estimated gaze point in conjunction with the identified object and the data corresponding to the identified object in the memory, the captured screenshot of the identified object and the universally unique signature, wherein the stored universally unique signature acts as an identifier for the identified object.

\* \* \* \* \*